Jan. 5, 1926.

H. G. GOULD 1,568,218

RUNNING GEAR FOR COASTER WAGONS

Filed Nov. 22, 1924

WITNESSES
George Mueller
M. E. Downey

INVENTOR.
Harry G. Gould
By R. H. Caldwell
ATTORNEY.

Patented Jan. 5, 1926.

1,568,218

UNITED STATES PATENT OFFICE.

HARRY G. GOULD, OF OSHKOSH, WISCONSIN, ASSIGNOR TO GOULD MANUFACTURING COMPANY, OF OSHKOSH, WISCONSIN, A CORPORATION OF WISCONSIN.

RUNNING GEAR FOR COASTER WAGONS.

Application filed November 22, 1924. Serial No. 751,550.

*To all whom it may concern:*

Be it known that I, HARRY G. GOULD, a citizen of the United States, and resident of Oshkosh, in the county of Winnebago and State of Wisconsin, have invented new and useful Improvements in Running Gears for Coaster Wagons, of which the following is a description, reference being had to the accompanying drawings, which are a part of this specification.

The invention relates to the running gear of coaster wagons and more particularly to the attaching means for securing the axle to the bolster.

The object of the invention is to provide a simple and inexpensive fastening means for securing an axle firmly to its bolster and permitting ready assembly of the parts.

Another object of the invention is to provide improvements over the axle retaining means disclosed in my Patent No. 1,498,652, whereby the use of auxiliary fastening elements is made unnecessary.

The invention further consists in the several features hereinafter set forth and more particularly defined by the annexed claims.

In the accompanying drawings; Fig. 1 is a side elevation partly in section of a coaster wagon embodying the invention;

Figure 1:
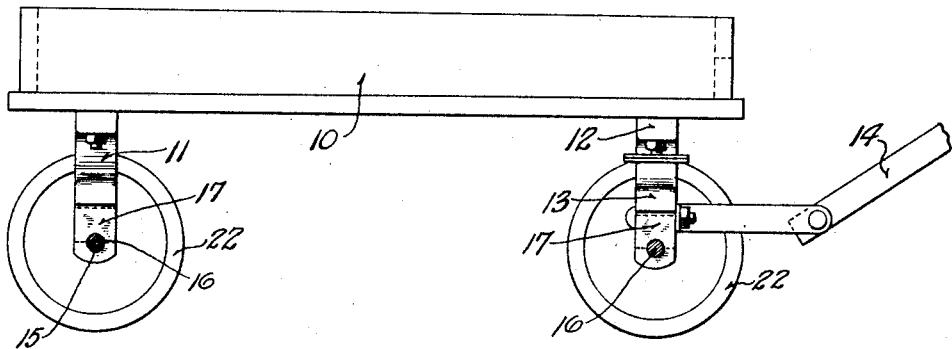
Figure 2:
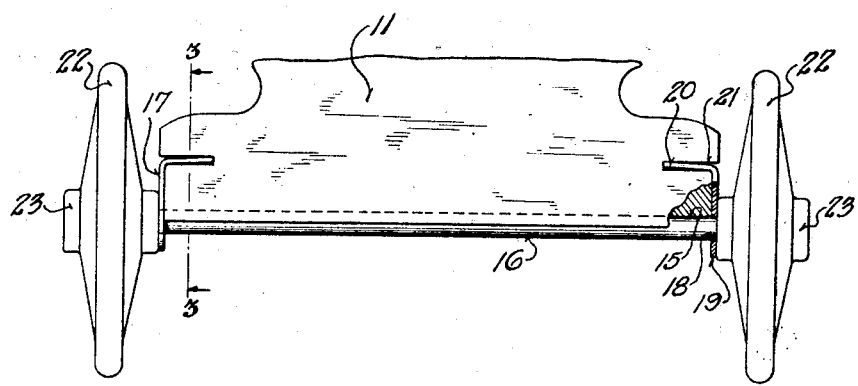
Fig. 2 is an end view of the assembled rear running gear, parts being shown in section.
Figure 3:
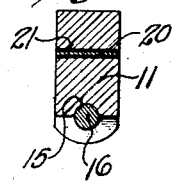
Fig. 3 is a sectional view taken on the line 3—3 of Fig. 2.
Figure 4:
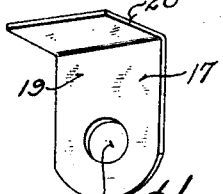
Fig. 4 is a detail perspective view of an axle retainer of the invention.

In these drawings the numeral 10 designates a wagon box, 11 the rear bolster, 12 the upper front bolster, and 13 the lower front bolster having the usual fifth wheel connection with the upper bolster 12, the usual handle 14 being pivotally secured to the bolster 13.

The rear bolster 11 and the front bolster 13 are each provided with a semi-cylindrical groove 15 in which an axle 16 is mounted. In each instance the axle 16 is firmly secured to the bolster by means of axle plates or retainers 17 provided with openings 18 through which the axle passes. Each of these retainers is in the form of a sheet metal angle having a leg 19 adapted to abut against the end of the bolster and a laterally extending leg 20 adapted to enter a slot 21 cut into the end of the bolster above the axle-receiving groove. The axle-receiving opening 18 in the leg 19 is adapted to register with the groove 15, and when the parts are assembled the retainers hold the axle firmly seated in the groove 15 by a pinching or wedging action on the axle. A longitudinal displacement of the axle is prevented by the frictional engagement of the axle with the bolster and with the retainers, and its lateral displacement is prevented by its disposition in the groove 15 in the bolster. Each axle retainer is held against lateral displacement by the passage of the axle through it and the engagement of the leg 20 with the walls of the slot 21, so that no other fastening elements are required.

The wheels 22 are journaled on the axles between the retainers 17 and the hub caps 23, and since the retainers 17 are between the ends of the bolster and the wheels, the endwise movement of the retainers would be prevented by this arrangement, but the tight frictional engagement of the retainers with the bolster and axle is mainly relied on to keep them in place. The retainers also serve as thrust members at the ends of the bolster against which the wheels 22 may bear.

The axle retainers are of very simple construction but serve to hold the axle firmly in place on the bolster and avoid the weakening of the axle incident to the customary practice of drilling holes therethrough to receive fastening bolts.

What I claim as new and desire to secure by Letters Patent is:

1. In a coaster wagon, the combination with an axle and a bolster having an axle-receiving groove and longitudinally extending recesses in its end portions above the groove, of axle retainer members disposed at the ends of the bolster, each member having a part abutting against an end of the bolster and through which the axle passes and a laterally extending portion adapted to enter and fit within the recess in the end of the bolster for preventing relative movement of said retainer member and bolster.

2. In a coaster wagon, the combination with an axle and a bolster supportingly engaged therewith and having longitudinally extending recesses in its ends, of axle-retaining angle members at the ends of the bolster, each angle member having a part extending downwardly adjacent the end of the bolster and through which the axle passes and a laterally extending part adapted to enter and fit within the recess in the end of this bolster for preventing relative movement of said angle member and bolster.

3. In a coaster wagon, the combination with an axle and a bolster engaged therewith against lateral movement and having longitudinally-extending openings in its end portions above said axle, of axle- retainer members abutting against the ends of the bolster and each having an opening for receiving said axle therethrough, parts of said retainer members being adapted to enter and fit within said openings in the ends of the bolster for preventing relative movement of said retainer and bolster and for retaining said axle tightly against said bolster.

In testimony whereof I affix my signature.

HARRY G. GOULD.